April 7, 1925.
J. V. GRAND
1,532,998
NUT LOCK
Filed April 4, 1921
Fig.1.
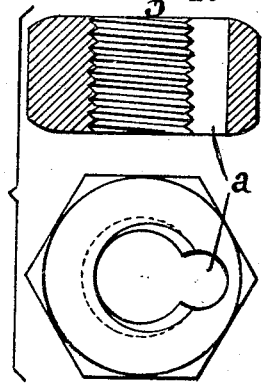
Fig.2. Fig.3. Fig.4.
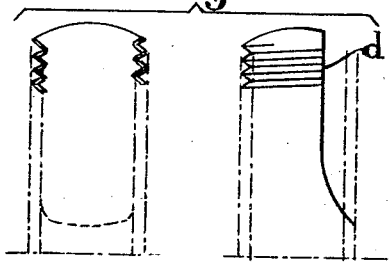 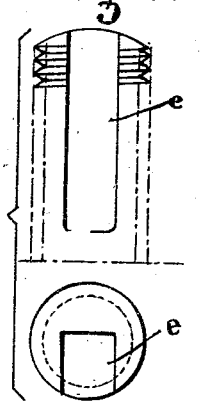 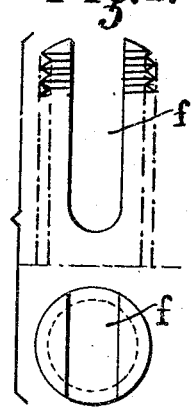
Fig.5.
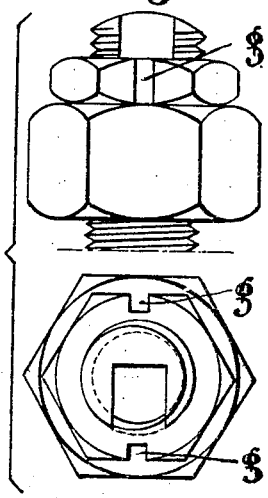
Fig.6.
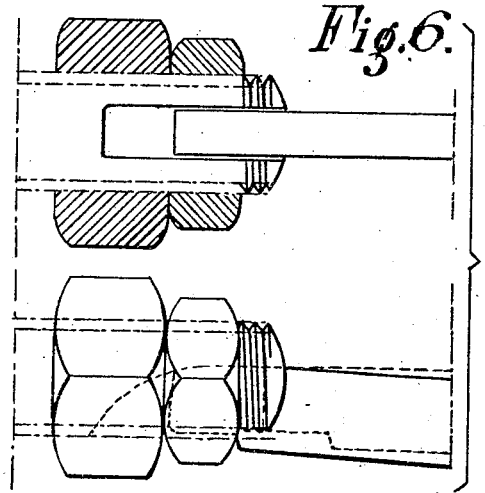
Inventor
Justinien Victor Grand
By B. Singer, Atty.

Patented Apr. 7, 1925.

1,532,998

UNITED STATES PATENT OFFICE.

JUSTINIEN VICTOR GRAND, OF BUSIGNY, FRANCE.

NUT LOCK.

Application filed April 4, 1921. Serial No. 458,276.

*To all whom it may concern:*

Be it known that I, JUSTINIEN VICTOR GRAND, a citizen of the Republic of France, residing at Busigny, Nord, France, have invented certain new and useful Improvements in Nut Locks; and I do declare the following to be a full, clear, and exact description of the invention, such as will enable others skilled in the art to which it appertains to make and use the same.

My invention relates to an improved nut lock, the object being to effect improvements in the construction of the shank of a bolt whereby a nut may be readily locked thereon, as hereinafter described and claimed.

Figure 1 is a section and also a plan of a nut embodying my invention.

Figures 2 to 4 show several modified forms of my invention as applied to a bolt.

Figure 5 shows the invention as applied to a jam-nut.

Figure 6 shows the way of utilizing the tool in carrying out the invention.

When the bolt is not to be unscrewed, it is preferable to modify only the nut in accordance with my invention by providing the same with a longitudinal recess $a$, as shown in Fig. 1, so that when the nut is in place on the shank of a bolt, portions of the thread of the bolt are exposed, and may be deformed, to lock the nut, by the use of a suitable tool, placed in the said recess, as will be understood.

When the bolt is to be subsequently unscrewed, it is of importance to avoid damaging the shank thereof.

Hence, in accordance with a modification of my invention, the shank may be provided with a longitudinal recess $d$, as in Fig. 2, or one or several grooves $e$, Fig. 3, or one or several complete slots $f$, Fig. 4, permitting the insertion and use of an appropriate tool.

This tool flattens the part of the nut thread exposed by said recess, leaving the shank thread untouched.

What has been previously stated can be applied as well to a jam-nut as to the tightening nut itself and without making any change in the construction of the nut. The jam-nut being locked, insures the locking of the other nut.

The use of a jam-nut that is not capable of being loosened offers an advantage if it is so constructed that it may be easily severed to free the tightening nut. To effect this, the jam-nut, the sizes of which are reduced with respect to the ones of the nut, presents one or several small sections $g$, Fig. 5, destined to be easily unfastened owing to the provision of longitudinal notches of sufficient depth.

A tool when inserted in said notches removes and separates the walls and so divides the nut into several pieces which unfasten by themselves without damaging the thread of the rod.

The various tools employed according to the different modifications of the invention are arranged for taking out of form only the threads of one of both pieces quite near the threads which are left untouched of the other piece, and are provided, when necessary, with a rim for limiting their displacement in their lodging.

Figure 6 represents a tool in its working position.

What I claim is:—

A nut, and a bolt on which the nut is screwed, said bolt having a longitudinal recess in one side, exposing parts of the thread of the nut, and adapted for the reception of a tool wherewith to deform the said exposed parts of the nut thread and thereby lock the nut on the shank said recess presenting a wall parallel with the axis of the bolt, and being open at the outer end, to receive the tool, the said wall forming a guide for the tool.

In testimony whereof I affix my signature.

JUSTINIEN VICTOR GRAND.